No. 746,176. PATENTED DEC. 8, 1903.
F. W. SCHNEIDER.
BEARING FOR THE SPINDLES OF LATCHES.
APPLICATION FILED MAR. 18, 1903.
NO MODEL.

WITNESSES
INVENTOR
Friederich W. Schneider
BY ATTORNEYS

No. 746,176. Patented December 8, 1903.

UNITED STATES PATENT OFFICE.

FRIEDRICH WILHELM SCHNEIDER, OF SOEST, GERMANY.

BEARING FOR THE SPINDLES OF LATCHES.

SPECIFICATION forming part of Letters Patent No. 746,176, dated December 8, 1903.

Application filed March 18, 1903. Serial No. 148,426. (No model.)

*To all whom it may concern:*

Be it known that I, FRIEDRICH WILHELM SCHNEIDER, gentleman, a subject of the Emperor of Germany, residing at 13 Jacobistrasse, Soest, Germany, have invented certain new and useful Improvements in Bearings for the Spindles of Latches and other Fastenings, of which the following is a specification.

My invention relates to an improved bearing for the spindles of latches or door fastenings which by rigidly connecting together the two sleeves forming the bearing for the spindle prevents the handles or knobs of the fastening and the spindle becoming loose even after it has been some time in use and the door has become warped by drying or from other causes. This bearing device can be applied to all existing fastenings without requiring them to be altered in any way, as has hitherto been the case with devices of this nature. Also the assembling together and taking apart of the several positions can be effected in a simple and easy manner.

In the accompanying drawings I illustrate an improved bearing embodying my invention.

Figure 1:
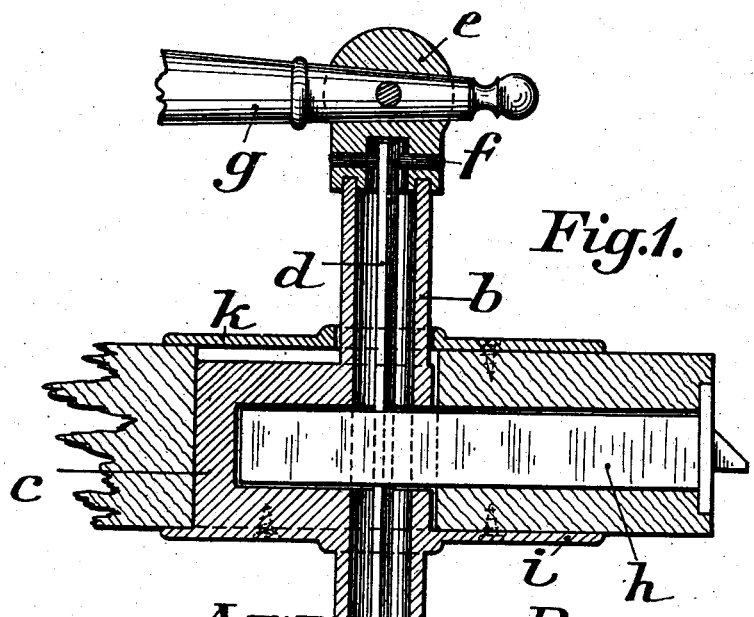
Figure 2:
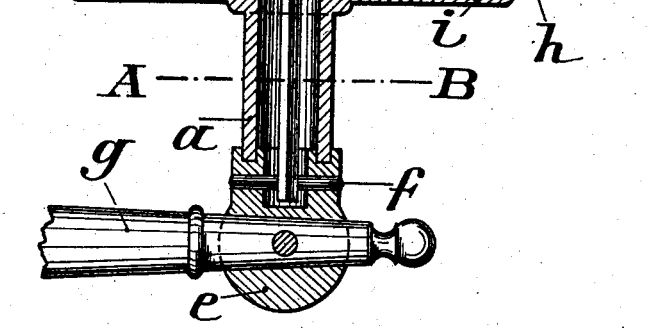

Figure 1 is a horizontal section of the bearing. Fig. 2 is a sectional side elevation thereof on the line A B, Fig. 1.

Referring to the figures, the sleeves $a$ and $b$, through which the spindle $d$ is passed, are rigidly connected together by a bow or bent piece $c$. In the free space inclosed by this bow $c$ between the two bearing-sleeves $a$ and $b$ is situated the latch or lock $h$, so that the bow $c$ embraces the same. The holes in the casing of the door-fastening for the spindle are in line with the sleeves $a$ and $b$.

Preferably the bow $c$ and the two sleeves $a$ and $b$ are formed in one, though the sleeves may be separately made and rigidly united to the bow-casting. Before inserting the spindle $d$ the latch $h$ is passed in between the sleeves $a$ and $b$ into the space inclosed by the bow $c$, so that the latch can be operated in the usual manner by the spindle, which is then passed through the sleeves and the follower or operating position of the latch.

In accordance with the construction of the follower the spindle $d$ is either square in section or cylindrical with a longitudinal groove for a feather key, or it may be of other convenient section.

For the purpose of securing the handles $g\ g$ the spindle projects on both sides beyond the sleeves $a$ and $b$ and is secured by a knob $e$ at each side. Each knob $e$ is grooved on the base, into which grooves the ends of the sleeves fit, while the spindle at the part where it enters each knob $e$ is secured thereto by a pin $f$.

The spindle is turned in the usual manner by means of the handles $g\ g$, fitted to the knobs $e\ e$, and the latch is so operated.

To secure the device to a door, a plate $i$ is cast on one side of the bow, and after the bearing device has been inserted in position a similar plate $k$ is placed on the other side and secured in a suitable manner to the door.

Having now particularly described and ascertained the nature of my said invention and in what manner the same is to be performed, I declare that what I claim is—

1. The combination with a lock, of spindle bearings or sleeves formed separate from and arranged on opposite sides of the lock, and a bent piece rigidly connecting said sleeves and extending rearwardly therefrom and across the rear end of the lock.

2. The combination with a lock, of two sleeves formed separate from and arranged on opposite sides of the lock and forming bearings for the spindle thereof, and a bent piece rigidly connecting said sleeves and extending across the lock-casing within the recess or socket in which the lock is placed and adapted to be secured against the side of the door to which the lock is applied.

3. The combination with a lock, of two sleeves separate from the lock and connected by an integral bent section extending from one side of the lock to the other, a spindle extending through the lock and into said sleeves, and handpieces secured to the outer ends of said sleeves and spindle.

4. The combination with a lock, of two sleeves or tubular bearings, separate from and arranged on opposite sides of the lock and connected by a bent piece extending about the rear end of the lock, a spindle extending through the lock and said sleeves, and knobs or handpieces secured to the outer ends of both said sleeves and spindle.

In testimony whereof I have signed my name to this specification in the presence of two subscribing witnesses.

FRIEDRICH WILHELM SCHNEIDER.

Witnesses:
OTTO KÖNIG,
ALBERT HEMSING.